United States Patent
Sheppard

(10) Patent No.: US 8,713,133 B2
(45) Date of Patent: Apr. 29, 2014

(54) METHODS, SYSTEMS AND COMPUTER PROGRAM PRODUCTS FOR IMPORTING DATA FROM AN EDGE ROUTER TO A NETWORK MANAGEMENT SYSTEM

(75) Inventor: Scott Sheppard, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2028 days.

(21) Appl. No.: 11/649,481

(22) Filed: Jan. 4, 2007

(65) Prior Publication Data
US 2008/0165801 A1 Jul. 10, 2008

(51) Int. Cl.
*G06F 15/177* (2006.01)
(52) U.S. Cl.
USPC .......................................... 709/220; 709/224
(58) Field of Classification Search
USPC ........................................................ 709/220
See application file for complete search history.

(56) References Cited

U.S. PATENT DOCUMENTS

| | | | |
|---|---|---|---|
| 7,130,854 B2 * | 10/2006 | Beadles et al. | 707/999.01 |
| 2002/0188719 A1 * | 12/2002 | Pham et al. | 709/224 |
| 2004/0258003 A1 * | 12/2004 | Kokot et al. | 370/254 |

OTHER PUBLICATIONS

Nakashima, T., "Time Scaling Property on Edge Routers," Innovative Computing, Information and Control, 2006. ICICIC '06. First International Conference on, vol. 1, No., pp. 60-63, Aug. 30-Sep. 1 2006.*
Redback: SmartEdge [online], [retrieved on Sep. 18, 2006]. Retrieved from the Internet: <URL:http://www.redback.com/Redback/Home/Products/SmartEdge.html> (3 pages).
InfoVista Enterprise Solutions—VistaInsight for Networks [online], [retrieved on Sep. 18, 2006]. Retrieved from the Internet: <URL:http://www.infovista.com/solutions/entersprise/vin/default.asp> 1 page).
VistaInsight for Networks, Enterprise Edition Datasheet [online], 2006 [retrieved on Sep. 18, 2006]. Retrieved from the Internet: <URL:http://www.infovista.com/pdf/DS_InfoVista_VistaInsight_for_Networks_Ent.pdf> (4 pages).
InfoVista—Products—VistaLink for NetFlow Tracker [online], [retrieved on Sep. 18, 2006]. Retrieved from the Internet: <URL:http://www.infovista.com/products/crannog/default.asp> (2 pages).
Netflow Tracker Datasheet [online], 2005 [retrieved on Sep. 18, 2006]. Retrieved from the Internet: <URL:http://www.infovista.com/pdf/DS_InfoVista_VistaLink_Crannog.pdf> (4 pages).

* cited by examiner

*Primary Examiner* — Christopher Biagini
(74) *Attorney, Agent, or Firm* — Myers Bigel Sibley & Sajovec, PA

(57) ABSTRACT

Methods of importing data from an edge router including a plurality of interface types to a network management system include configuring the edge router to export a flat file containing the data at a designated time to a designated network device communicatively coupled to the edge router. The flat file includes data associated with a plurality of different ones of the interface types. The flat file is received at the designated network device. The data from the received flat file is parsed to a format configured to be imported by the network management system at the designated network device. The parsed data is provided to the network management system.

18 Claims, 4 Drawing Sheets

METHODS, SYSTEMS AND COMPUTER PROGRAM PRODUCTS FOR IMPORTING DATA FROM AN EDGE ROUTER TO A NETWORK MANAGEMENT SYSTEM

BACKGROUND OF THE INVENTION

The present invention relates to methods, systems and computer program products for monitoring computer communication networks and more particularly, for acquiring data related to such networks.

Computer networks have grown increasingly complex with the use of distributed client/server applications, mixed platforms and multiple protocols all on a single physical backbone. The control of traffic on the networks is likewise moving from centralized information technology (IT) departments to distributed workgroups. The growing utilization of computer networks is not only causing a move to new, high-speed technologies, but is at the same time making the operation of computer networks more critical to day-to-day business operations.

The growth in complexity and dependence on computer networks heightens the need for network management tools to design, build and maintain computer networks. The mix of protocols, software applications and vendors of installed hardware on many computer networks generally increases the difficulty of accomplishing network management. This problem may arise in planning or designing changes to a network, monitoring performance of a network, and testing the impact on performance of different hardware and software being installed on a network. The acquisition of data from network components for analysis may also be problematic.

A computer network, for example based on an Internet protocol (IP) architecture, may be described as including a hierarchy of Access, Edge, and Core. Access circuits generally connect to a customer or Customer Provided/Premise Equipment (CPE), which access circuits may be multiplexed, integrated, or aggregated to Edge routers. At the Edge, different protocols (IP, SNA, Appletalk etc) along with different layer 2 transport methods (Fream relay, ATM, Ethernet) may be combined by a network carrier or provider depending on their architecture into Core protocols, such as Internet Protocol (IP). In order to reduce the number and types of different routing and switching systems, a type of edge router device referred to as a Broadband Remote access server (BRAS) or Multi-Service Switching System (MSSS). A Multi-Service Edge (MSE) system may be used, which generally provides protocol conversion from Access protocols (PPP o A or PPP o E etc) to one or more Core protocols (TCP/IP).

As more capable edge routers are utilized, the challenge of making and acting on measurements regarding the traffic on these routers for normal operational support and capacity planning generally increases. These routers can sometimes support approximately 40×1 Gigabit Ethernet interfaces or a combination of Ethernet, 10 Gigabit Ethernet, ATM or Frame Relay interfaces. In comparison, earlier generation networks may support much less traffic and interface diversity. As such, a network management system may now need to consider hundreds if not thousands of devices, each supporting 40×1 Gigabit Ethernet links. Thus the magnitude of the traffic measurement numbers and effort may become staggering.

One difficulty with managing large amounts of traffic to measure and manage is that current data gathering methods may overwhelm the processing power of the edge router. For example, one edge router, the Redback SE 800 router, may provide traffic data responsive to a Simple Network Management Protocol (SNMP) query. This approach generally requires significant involvement of the central processing unit (CPU) of the router, as an external system typically polls the router under management for information relating to many variables per link. If the number of such polls is too great per unit time, the router may cease functioning.

An alternative method for acquiring traffic data from a Redback SE 800 router is to use a BulkStats feature of the router. One problem with the BulkStat approach is that the volume of data to be measured may be massive for high end networks. More particular, a user can generally export Redback Bulkstat data in a series of unique exported files. In this case one Bulkstat "Schema" (example non QoS enabled Ethernet, or QoS enabled ATM or Dot lq VLAN interfaces etc) can be collected and exported. The data fields may be collected every N minutes (e.g., 1 to 5 minute intervals) and the flat file may be exported every M minutes (e.g., every hour). While the exported data may always be uniform with this approach, the router still typically performs these operations for every schema applied to the router. Thus, there may be numerous variations of export schemas even where the gathering of the data and the export of data in one format and file for every interface type is supported, such as with Bulkstats of flat file export from Redback SE 800 and similar routers. However, applying several schemas and collecting unique data per schema and exporting unique files for each schema may still place a significant processing load on the Redback SE 800 or other edge router, which may interfere with the processing of traffic by the router.

SUMMARY OF THE INVENTION

In some embodiments of the present invention, methods of importing data from an edge router including a plurality of interface types to a network management system include configuring the edge router to export a flat file containing the data at a designated time to a designated network device communicatively coupled to the edge router. The flat file includes data associated with a plurality of different ones of the interface types. The flat file is received at the designated network device. The data from the received flat file is parsed to a format configured to be imported by the network management system at the designated network device. The parsed data is provided to the network management system. The edge router may be a broadband remote access server (BRAS). The designated network device may be a file transport protocol (FTP) server. Providing the parsed data may be preceded by configuring the network management system to receive the parsed data in a database associated with the network management system.

In further embodiments, configuring the network management system includes generating a management information base (MIB) that characterizes the parsed data and providing the generated MIB to the network management system. Configuring the edge router may include generating a configuration file having a format specified for the edge router, the configuration file including a plurality of schema associated with respective ones of the different interface types that specify data to be collected for the different interface types for export in the flat file, and providing the generated configuration file to the edge router.

In other embodiments, configuring the edge router includes configuring the edge router to export the flat file at a data export interval. Configuring the edge router may further include configuring the edge router to collect data specified by the plurality of schema at a data sampling interval that is more frequent than the data export interval and the imported flat file may include data collected at a plurality of different times on the edge router. Parsing the data may include executing a program provided by the network management server that executes network management system type specific parsing operations.

In further embodiments, the designated network device is configured to parse data for export to a plurality of different network management server types. Parsing the data includes executing programs provided by the plurality of different network management server types that execute network management server type specific parsing operations to provide a plurality of parsed data for export to respective ones of the different network management systems. Configuring the edge router may include configuring a plurality of different types of edge routers to export a flat file including generating different configuration files for respective ones of the different types of edge routers and receiving flat files from the respective ones of the different types of edge routers.

In yet other embodiments, the edge router acquires network traffic data associated with respective ones of the plurality of different interface types and having an associated subscriber identification at a time associated with the data based on the configuration file. The edge router further formats the acquired network traffic data to provide the flat file and exports the flat file to the designated network device at a time specified by the data export interval.

In further embodiments, a network management server associated with the network management system receives the parsed data in the database associated with the network management system based on the MIB. The network management server further accesses the stored data and generates a report based on the stored data responsive to a user request to the network management system.

In yet further embodiments, network devices are provided including a network interface communicatively coupled to an edge router including a plurality of interface types and to a network management system. The network devices further include a parsing module coupled to the network interface configured to receive a flat file containing data from the edge router at a designated time and to generate parsed data from the imported flat file a format that has a format configured to be imported by the network management system. The flat file includes data associated with a plurality of different ones of the interface types of the edge router. The network device further includes an export module configured to provide parsed data to the network management system.

In other embodiments, systems are provided including a network device as described above. The systems further include the edge router. The edge router includes a configuration file having a format specified for the edge router. The configuration file includes a plurality of schema associated with respective ones of the different interface types that specify data to be collected for the different interface types for export in the flat file. The systems further include the network management system. The network management system includes a MIB that characterizes the parsed data. The edge router may be a broadband remote access server (BRAS). The network device may be a file transfer protocol (FTP) server.

In yet other embodiments, computer program products for importing data from an edge router including a plurality of interface types to a network management system are provided. The edge router is configured to export a flat file containing the data at a designated time to a designated network device communicatively coupled to the edge router. The flat file includes data associated with a plurality of different ones of the interface types. The computer program product includes a computer-readable storage medium having computer-readable program code embodied in said medium. The computer-readable program code includes computer-readable program code that receives the flat file at the designated network device and computer-readable program code that parses the data from the received flat file to a format configured to be imported by the network management system at the designated network device. The computer-readable program code further includes computer-readable program code that provides the parsed data to the network management system.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF EXEMPLARY EMBODIMENTS

Figure 1:
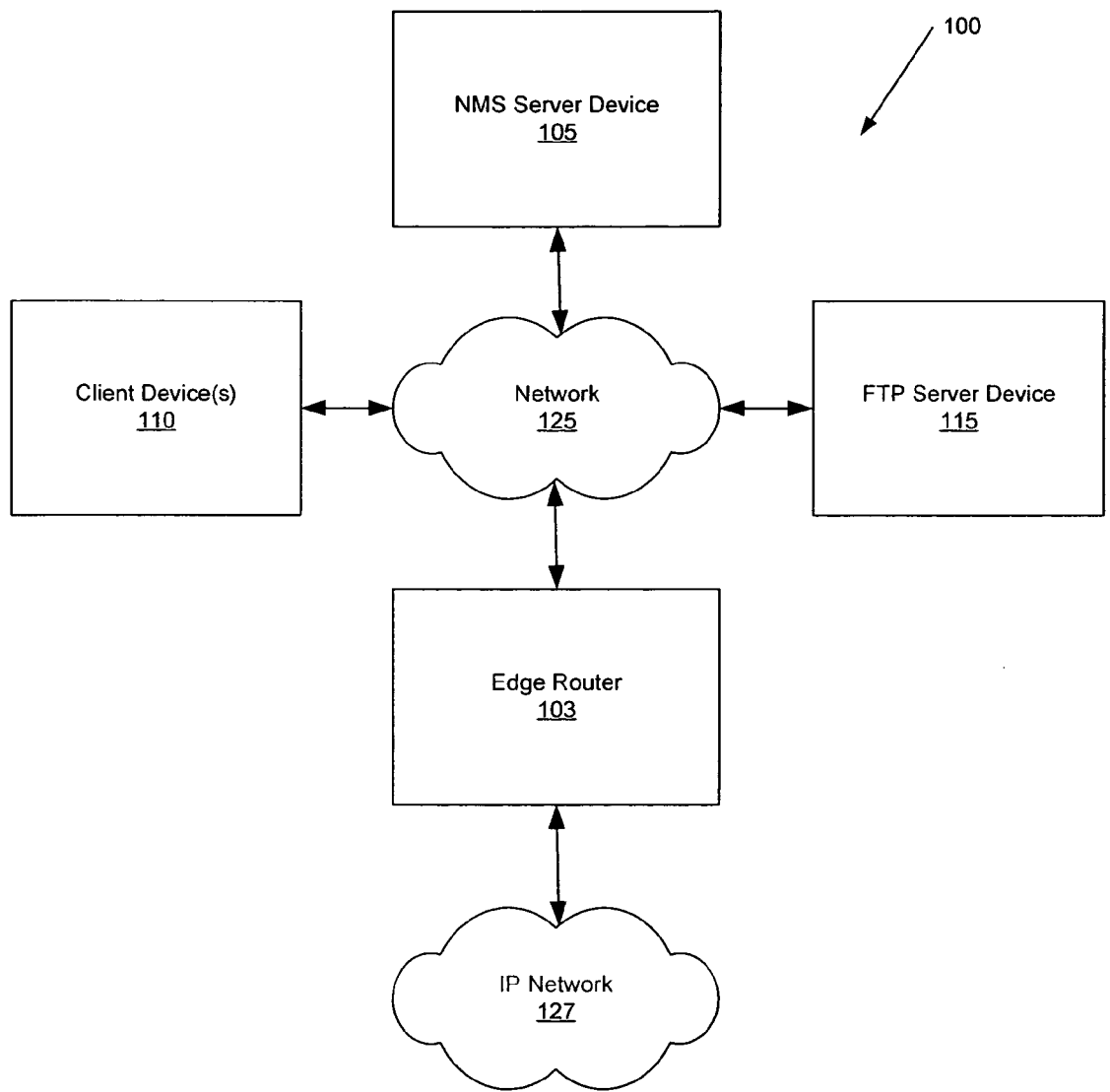
FIG. 1 is a block diagram of a hardware and software environment in which the present invention may operate according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

Embodiments of the present invention will now be described below with respect to FIGS. 1 through 4. Referring first to FIG. 1, a hardware and software environment in which the present invention may operate according to some embodiments is illustrated. As shown in the embodiments of FIG. 1, the environment 100 includes an edge router 103, a network management system (NMS) server device 105, and a file transport protocol (FTP) server device 115 coupled to client device(s) 110 over a network 125. As will be understood by those having skill in the art, the network 125 may include a plurality of separate linked physical communication networks, which, using a protocol such as the Internet protocol (IP), may appear to be a single seamless communications network to user application programs. It is further to be understood that, while for illustration purposes in FIG. 1, the network 125 is shown as a single network, it may be comprised of a plurality of separate interconnected physical networks. The network 125 may be a local area network and/or wide area network managed by a corporation or the like and may include various security features to control access to the network 125.

As also shown in FIG. 1, the edge router 103 connects the network 125 to an external Internet Protocol (IP) network 127. As will be understood by those having skill in the art, the network 127 may include a plurality of separate linked physical communication networks, which, using a protocol such as the Internet Protocol (IP), may appear to be a single seamless communications network to user application programs. It is further to be understood that, while for illustration purposes in FIG. 1, the network 127 is shown as a single network, it may be comprised of a plurality of separate interconnected physical networks. In some embodiments, the edge router 103 is a BRAS router, such as a Redback SE 800.

As will be described further herein, in some embodiments, a designated network device, such as the FTP server device 115, may be configured to acquire data for different interfaces on the edge router 103 from the edge router 103 as a single flat file and parse the data from the flat file to a form suitable for import to the NMS server device 105. As such, a consolidated bulkstat or flat file export of data may be provided from the edge router 103, thereby reducing the processing burden on the edge router 103, while providing for effective importing of the data to the network management system executing on the NMS server device 105.

Figure 2:
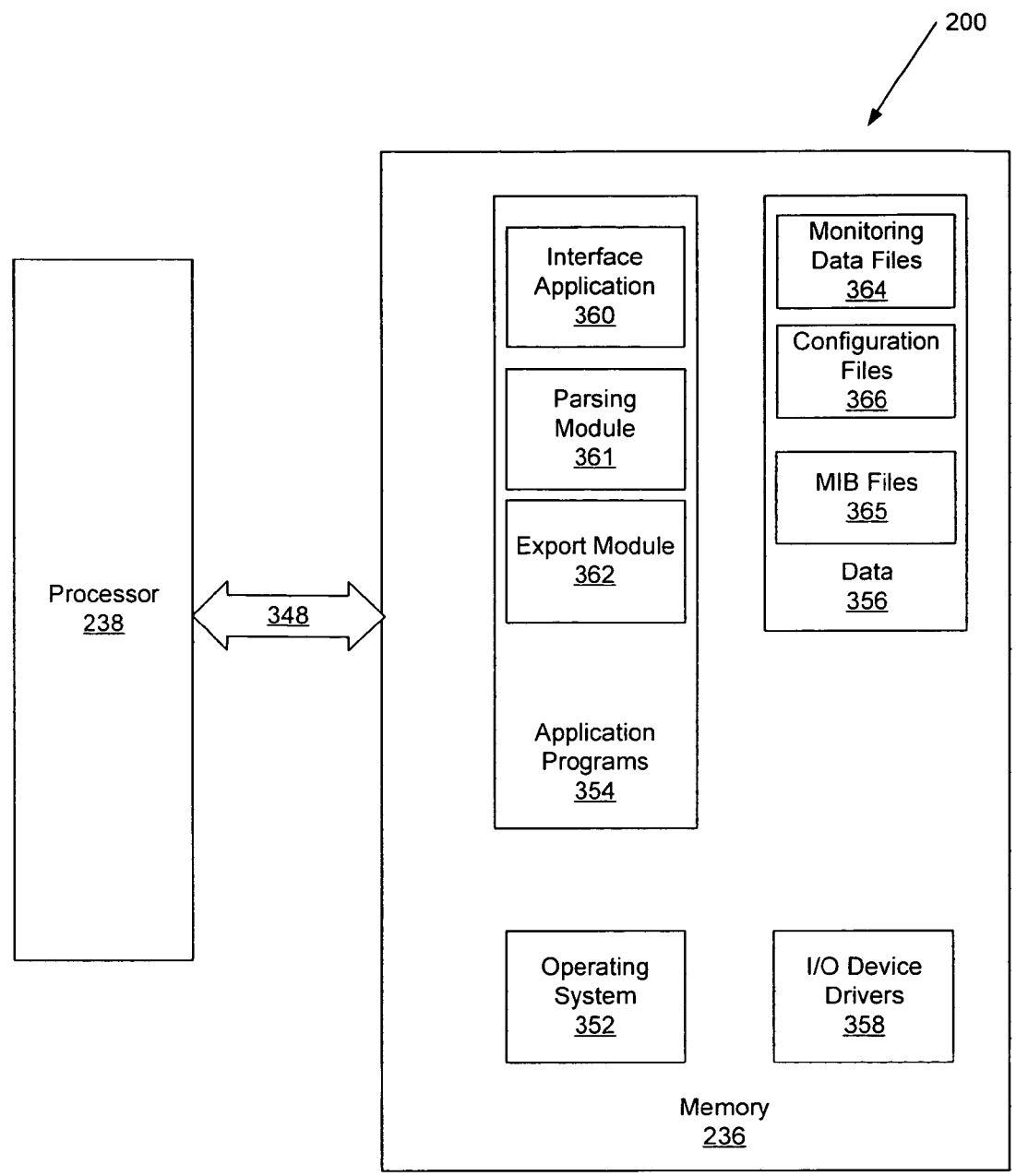
FIG. 2 is a block diagram of a data processing system according to some embodiments of the present invention.

FIG. 2 is a block diagram of a data processing system 200 that illustrates methods, systems and computer program products for importing data from an edge router including a plurality of interface types to a network management system in accordance with some embodiments of the present invention. More particularly, FIG. 2 illustrates features of embodiments of a NMS server device 105, server device 115 and/or edge router 103, although it will be described primarily herein with reference to embodiments of a server device 115.

As shown for the embodiments of FIG. 2, the data processing system 200 includes a processor 238 that communicates with a memory 236 via an address/data bus 348. The processor 238 can be any commercially available or custom microprocessor. The memory 236 is representative of the overall hierarchy of memory devices containing the software and data used to implement the functionality of the data processing system 200. The memory 236 can include, but is not limited to, the following types of devices: cache, ROM, PROM, EPROM, EEPROM, flash memory, SRAM, and DRAM.

As shown in FIG. 2, the memory 236 may include several categories of software and data used in the data processing system 200: the operating system 352; the application programs 354; the input/output (I/O) device drivers 358; and the data 356. As will be appreciated by those of skill in the art, the operating system 352 may be any operating system suitable for use with a data processing system, such as Solaris from Sun Microsystems, OS/2, AIX or System390 from International Business Machines Corporation, Armonk, N.Y., Windows95, Windows98, Windows NT, Windows ME, Windows XP or Windows2000 from Microsoft Corporation, Redmond, Wash., Unix or Linux. The I/O device drivers 358 typically include software routines accessed through the operating system 352 by the application programs 354 to communicate with network coupled devices, input/output devices, such as a display, keyboard and/or the like, and certain memory 236 components. The application programs 354 are illustrative of the programs that implement the various features of the data processing system (network device) 200 and preferably include at least one application that supports operations according to embodiments of the present invention. Finally, the data 356 represents the static and dynamic data used by the application programs 354, the operating system 352, the I/O device drivers 358, and other software programs that may reside in the memory 236.

As illustrated in the embodiments of FIG. 2, the application programs 354 may include an interface application 360, a parsing module 361 and an export module 362. The interface application 360, in cooperation with the I/O device drivers 358 or other communication interface of the network device 200, communicatively couples the network device 200 to an edge router that includes a plurality of interface types. The interface application 360 further couples the network device 200 to a network management system. For example, with reference to the embodiments illustrated in FIG. 1, the interface application 360, in cooperation with the communication hardware of the network device 200 may couple the network device 200 to the NMS server device 105 and the edge router 103. The network device 200 may be implemented as a FTP server device 115 as illustrated in FIG. 1.

The parsing module 361 is coupled operatively to the interface application 360 so as to receive a flat file containing data from the edge router 103 at a designated time. The parsing module 361 is further configured to generate parsed data from the imported flat file in a format configured to be imported by the network management system. The flat file includes data associated with a plurality of different ones of the interface types of the edge router 103. The export module 362 is configured to provide the parsed data to the network management system.

For the illustrated embodiments of FIG. 2, the data 356 includes monitoring data files 364, configuration files 366 and/or MIB files 365. The monitoring data files 364 may include information related to timing of execution of operations, addressing information associated with different edge routers 103 and/or NMS server devices 105 and the like, which may be utilized by the interface application module 360, the parsing module 361 and/or the export module 362 in carrying out operations as will be described further herein with reference to the flowchart illustrations of FIGS. 3 and 4. The configuration files 366 may include copies of configuration files that have been generated and provided to different edge routers 103. The MIB files 365 may include copies of MIB files that have been generated and provided to one or more NMS server devices 105.

The network device 200 may be coupled to an edge router 103 that includes a configuration file having a format specified for the edge router 103. The configuration file may include a plurality of schema associated with respective ones of the different interface types, which schema specify data for the different interface types for export in the flat file by the edge router 103. A copy of the configuration file may be maintained by the network device in the configuration file data 366. The network device 200 may be part of a system that includes a network management system, such as the network management system resident on the NMS server device 105 shown in FIG. 1. The network management system may include a MIB that characterizes the parsed data. As seen in FIG. 2, the network device 200 may also maintain a copy of the network management system MIB file in the MIB files 365.

The data processing system 200 has been generally described above from the perspective of a data processing system 200 operating as a server device 115 (see FIG. 1). However, it will be understood that some embodiments of the present invention include data processing systems configured to act as an NMS server device 105 and/or an edge router 103.

While the present invention is illustrated, for example, with reference to the interface application 360 and the other modules discussed above being application programs in FIG. 2, as will be appreciated by those of skill in the art, other configurations may also be utilized for the various modules of FIG. 2 described as application programs while still benefiting from the teachings of the present invention. For example, the interface application 360 may also be incorporated into the operating system 352 or other such logical division of the data processing system 200. Thus, the present invention should not be construed as limited to the configuration of FIG. 2, but is intended to encompass any configuration capable of carrying out the operations described herein.

Figure 3:
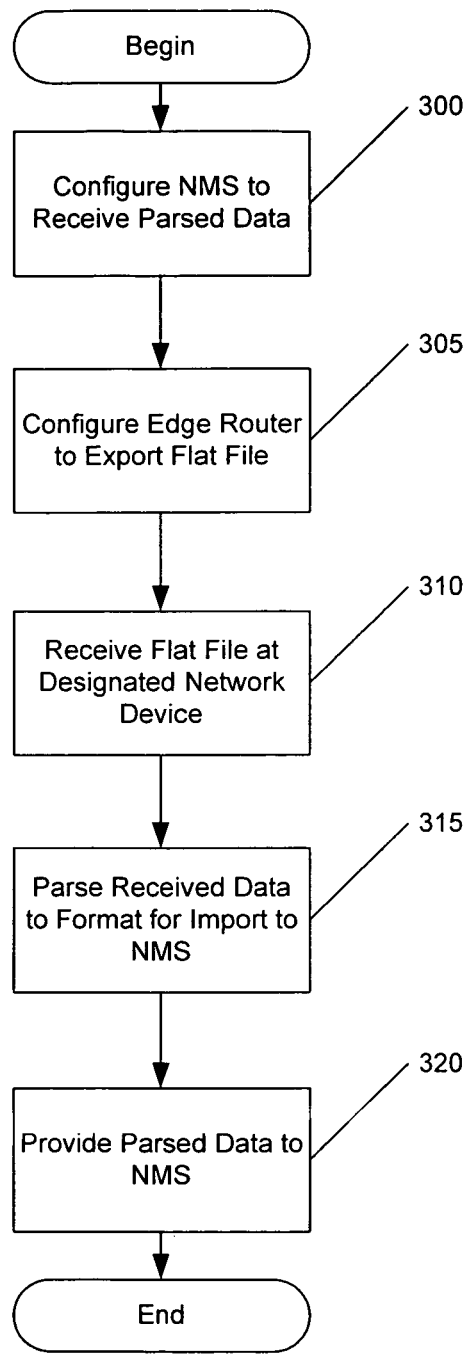
FIGS. 3 to 4 are flowcharts illustrating operations for importing data from an edge router including a plurality of interface types to a network management system according to some embodiments of the present invention.
Figure 4:
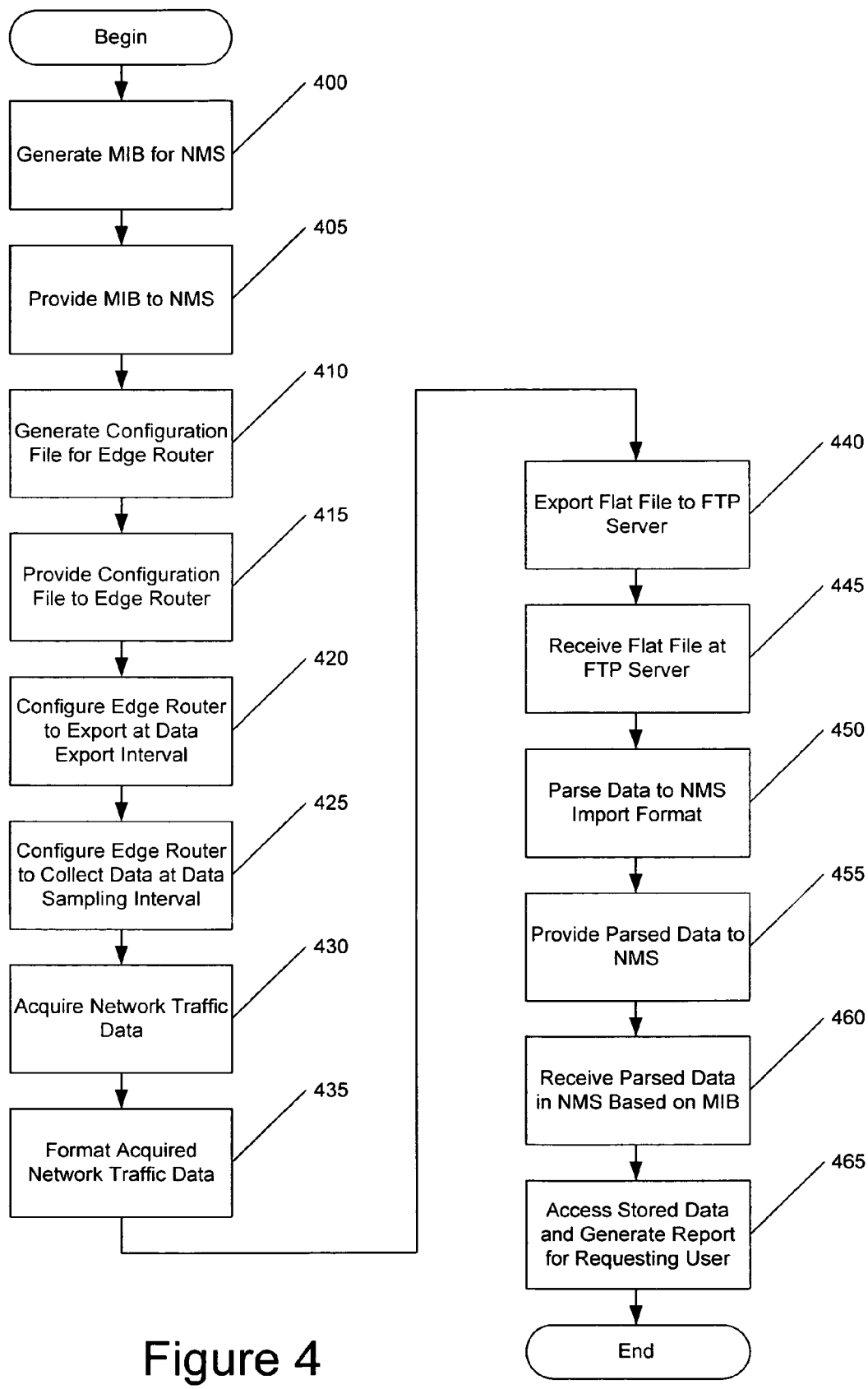

Some embodiments of operations for importing data from an edge router including a plurality of interface types to a network management system will now be described with reference to the flowchart illustrations of FIGS. 3 and 4. Referring first to the embodiments illustrated in FIG. 3, operations begin in some embodiments by configuring a network management system to receive parsed data collected from edge routers in a database associated with the network management system (Block 300). In other words, the NMS, which is typically configured to pull data directly from edge routers using simple network management protocol (SNMP) based queries to the routers, may be configured to, instead, acquire the data for various interface types on different edge routers pulled from those routers in a flat file format and converted (parsed) by a designated network device to a format suitable for importing by the NMS utilizing the configuration provided at Block 300.

The edge router or routers are configured to export a flat file containing the data at a designated time to a designated network device communicatively coupled to the edge router(s) (Block 305). The flat file includes data associated with a plurality of different ones of the interface types. The different interface types may be, for example, different rate Ethernet interfaces, ATM or frame relay interfaces and/or the like, all supported on a single edge router.

The flat file is received at the designated network device (Block 310). The data from the received flat file is parsed to a format configured to be imported by the network management system at the designated network device (Block 315). The parsed data is provided to the network management system (Block 320).

Further embodiments of operations for importing data from an edge router including a plurality of interface types to a network management system will now be described with reference to the flowchart illustration of FIG. 4. As seen in the embodiments illustrated in FIG. 4, operations begin by generating a MIB that characterizes parsed data that will be received from a designated network device gathering the data from one or more edge routers for the network management system (Block 400). The generated MIB is provided to the network management system (Block 405). Note that, for purposes of the explanation herein, a single network management system and a single edge router will be referred to in describing operations with reference to FIG. 4. However, it will be understood that the designated network device may be configured to parse data for export to a plurality of different network management server types in some embodiments of the present invention and further may be configured to receive flat files containing data from a plurality of different edge routers, ones of which may be of different types from different manufacturers.

Operations related to configuring the edge router will now be described with reference to Blocks 410-425. A configuration file having a format specified for the edge router is generated (Block 410). The configuration file includes a plurality of schema associated with respective ones of the different interface types that specify data to be collected for the different interface types for export in the flat file. As discussed above, a plurality of different types of edge routers may be configured to export a flat file and different configuration files may be generated for respective ones of the different types of edge routers (Block 410). The generated configuration file is provided to the edge router at Block 415.

An example of a configuration file 366 for a Redback SE 800 edge router, including a plurality of schema, is as follows:

```
Config
!
bulkstats schema profile global health format "date: %s, time: %s, sysuptime:%u,
cpu5sec: %u, cpu1min: %u, cpu5min: %u, active_subs: %u, active_subs_ppp:
%u, total_user_mem: %u, free_user_mem: %u," date timeofday sysuptime
cpu5sec cpu1min cpu5min active_subs active_subs_ppp total_user_mem
free_user_mem
!
bulkstats schema profile global subscribers format "epochtime: %u, active_subs:
%u, active_subs_dot1qEnet: %u," epochtime active_subs active_subs_dot1qEnet
!
bulkstats schema profile port NON-QoS-port-stat format "epochtime: %u,
portspeed: %u, porttype: %s, slot: %u, port: %u, inoctets: %u, outoctets: %u,
mcast_inoctets: %u, mcast_outoctets: %u, rcv_drop_octets: %u,
```

```
xmt_drop_octets: %u," epochtime portspeed porttype slot port inoctets outoctets
mcast_inoctets mcast_outoctets rcv_drop_octets xmt_drop_octets
!
bulkstats schema profile port QoS-port-stat format "epochtime: %u, portspeed:
%u, porttype: %s, slot: %u, port: %u, inoctets: %u, outoctets: %u,
mcast_inoctets: %u, mcast_outoctets: %u, qos_inoctets: %u, qos_outoctets: %u,
rcv_drop_octets: %u, xmt_drop_octets: %u," epochtime portspeed porttype slot
port inoctets outoctets mcast_inoctets mcast_outoctets qos_inoctets qos_outoctets
rcv_drop_octets xmt_drop_octets
!
bulkstats schema profile dot1q NON-QoS-vlan-stat format " epochtime: %u,
cctstate: %s, vlan-id: %u, slot: %u, port: %u, inoctets: %u, outoctets: %u,
mcast_inoctets: %u, mcast_outoctets: %u, rcv_drop_octets: %u,
xmt_drop_octets: %u," epochtime cctstate vlan_id slot port inoctets outoctets
mcast_inoctets mcast_outoctets rcv_drop_octets xmt_drop_octets
!
bulkstats schema profile dot1q QoS-vlan-stat format " epochtime: %u, cctstate:
%s, vlan-id: %u, slot: %u, port: %u, inoctets: %u, outoctets: %u, qos_inoctets:
%u, qos_outoctets: %u rcv_drop_octets: %u xmt_drop_octets: %u," epochtime
cctstate vlan_id slot port inoctets outoctets qos_inoctets qos_outoctets
rcv_drop_octets xmt_drop_octets
!
bulkstats schema profile atm atm-link format "epochtime: %u, cctstate: %s, vci:
%u, vpi: %u, slot: %u, port: %u, inoctets: %u, outoctets: %u, mcast_inoctets:
%u, mcast_outoctets: %u, rcv_drop_octets: %u, xmt_drop_octets: %u,"
epochtime cctstate vci vpi slot port inoctets outoctets mcast_inoctets
mcast_outoctets rcv_drop_octets xmt_drop_octets
```

The edge router is further configured to export the flat file at a data export interval (Block 420). As further seen in the embodiments of FIG. 4, the edge router is also configured to collect data specified by the plurality of schema at a data sampling interval (Block 425). In some embodiments, the data sample rate is more frequent than the data export interval. The imported flat file generated at the edge router may include data collected at a plurality of different times on the edge router.

Operations carried out at the edge router will now be described with reference to Blocks 430-435. Network traffic data associated with respective ones of a plurality of different interface types of the edge router is acquired (Block 430). The acquired network traffic data may have an associated subscribed identification. The network traffic data may be acquired at a time associated with the data based on the configuration file. In other words, the schema may specify a sampling interval for acquiring data and the acquired data may further have an associated time stamp included with the data.

The acquired network traffic data is formatted to provide a flat file (Block 435). The flat file is exported to the designated network device at a time specified by the data export interval (Block 440).

The flat file is received at the designated network device (Block 445). The data from the received flat file is parsed to a format configured to be imported by the network management system at the designated network device (Block 450). The parsed data is provided to the network management system (Block 455). Parsing the data at Block 450 may include executing a program provided by the network management server that executes network management system type specific parsing operations. Where a plurality of different network management server types are supported, parsing the data may include executing programs provided by the respective plurality of different management server types that execute network management server types specific parsing operations to provide a plurality of parsed data for export to respective ones of the different network management systems.

Operations carried out by the network management server associated with the network management system for some embodiments of the present invention will now be described with reference to Blocks 460 and 465. The parsed data is received in a database associated with the network management system based on the MIB (Block 460). Responsive to a user request or the like, the stored data is accessed and a report is generated for the user based on the stored data (Block 465).

In particular embodiments of the present invention where the edge router 103 is a Redback SE 800, available from Redback Networks, Inc. of San Jose, Calif. and the NMS executing on the NMS server device 105 is an InfoVista NMS, available from InfoVista Corporation of Herndon, Va., operations may proceed as follows:

1) A configuration for Bulkstats is installed on the Redback SE 800.

2) The Redback SE 800 is enabled to export the Bulkstat file to a FTP server periodically, such as once an hour.

3) The FTP server runs a parsing program, for example a PERL program, that parses the Bulkstat file, including calling a program supplied by InfoVista called Vista Bridge (VB). VB will then call other functions to put the parsed data into the InfoVista database.

4) Once the PERL program finishes it may be paused for the export period, such as 1 hour, and then repeat.

5) Once operation #3 is complete a report may be created on InfoVista. The report may be generated based on a MIB that links the data imported by Vista Bridge into something that InfoVista can read as described generally above.

6) Once the report is created, a user can view the Redback Bulkstat data from the InfoVista user interface.

As will be appreciated by one of skill in the art, the present invention may be embodied as a method, system, or computer program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk, PERL or C++. However, the computer program code for carrying out operations of the present invention may also be written in conventional procedural programming languages, such as the "C" programming language and/or a lower level assembler language. The program code may execute entirely on the user's computer (i.e., controller of the user's mobile terminal), partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present invention was described in part above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and schematic diagrams of FIGS. 1 through 4 illustrate the architecture, functionality, and operations of some embodiments of methods, systems, and computer program products for importing data from an edge router including a plurality of interface types to a network management system. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of importing data from an edge router including a plurality of interface types to a network management system, comprising:
configuring the edge router to export a flat file containing the data at a designated time to a designated network device communicatively coupled to the edge router, wherein the flat file includes data associated with a plurality of different ones of the interface types;
receiving the flat file at the designated network device;
parsing the data from the flat file to a format to be imported by the network management system at the designated network device; and
providing the data that was parsed to the network management system.

2. The method of claim 1, wherein the edge router comprises a broadband remote access server.

3. The method of claim 1, wherein providing the parsed data is preceded by configuring the network management system to receive the data that was parsed in a data base associated with the network management system.

4. The method of claim 3, wherein configuring the network management system comprises:
generating a management information base that characterizes the data that was parsed; and
providing the generated management information base to the network management system.

5. The method of claim 4, wherein configuring the edge router comprises:
generating a configuration file having a format specified for the edge router, the configuration file including a plurality of schema associated with respective ones of the different interface types that specify data to be collected for the different interface types for export in the flat file; and
providing the configuration file to the edge router.

6. The method of claim 5, wherein configuring the edge router further comprises configuring the edge router to export the flat file at a data export interval.

7. The method of claim 6, wherein configuring the edge router further comprises configuring the edge router to collect data specified by the plurality of schema at a data sampling interval that is more frequent than the data export interval and wherein the flat file includes data collected at a plurality of different times on the edge router.

8. The method of claim 6, wherein parsing the data includes executing a program provided by the network management server that executes network management system type specific parsing operations.

9. The method of claim 8, wherein the designated network device is to parse data for export to a plurality of different network management server types and wherein parsing the data includes executing programs provided by the plurality of different network management server types that execute network management server type specific parsing operations to provide a plurality of parsed data for export to respective ones of the different network management systems.

10. The method of claim 9, wherein configuring the edge router comprises configuring a plurality of different types of edge routers to export a flat file including generating different configuration files for respective ones of the different types of edge routers and receiving flat files from the respective ones of the different types of edge routers.

11. The method of claim 9, wherein the designated network device comprises a file transport protocol server.

12. The method of claim 8, further comprising the following carried out at the edge router:
acquiring network traffic data associated with respective ones of the plurality of different interface types and having an associated subscriber identification at a time associated with the data based on the configuration file;
formatting the network traffic data to provide the flat file; and
exporting the flat file to the designated network device at a time specified by the data export interval.

13. The method of claim 12, further comprising the following carried out by a network management server associated with the network management system:
receiving the data that was parsed in the data base associated with the network management system based on the management information base; and
accessing the data received in the data base and generating a report based on the data received in the data base responsive to a user request to the network management system.

14. A network device, comprising
a network interface communicatively coupled to an edge router including a plurality of interface types and to a network management system;
a parsing module coupled to the network interface and to receive a flat file containing data from the edge router at a designated time and to generate parsed data from the flat file that has a format to be imported by the network management system, wherein the flat file includes data associated with a plurality of different ones of the interface types of the edge router; and
an export module to provide the data that was parsed to the network management system.

15. A system including the network device of claim 14, the system further comprising:
the edge router, wherein the edge router includes a configuration file having a format specified for the edge router, the configuration file including a plurality of schema associated with respective ones of the different interface types that specify data to be collected for the different interface types for export in the flat file; and
the network management system, wherein the network management system includes a management information base that characterizes the parsed data.

16. The system of claim 15, wherein the edge router comprises a broadband remote access server.

17. The system of claim 16, wherein the network device comprises a file transfer protocol server.

18. A computer program product for importing data from an edge router including a plurality of interface types to a network management system, the edge router being configured to export a flat file containing the data at a designated time to a designated network device communicatively coupled to the edge router, wherein the flat file includes data associated with a plurality of different ones of the interface types; the computer program product comprising:
a non-transitory computer-readable storage medium having computer-readable program code embodied in said medium, said computer-readable program code comprising:
computer-readable program code to receive the flat file at the designated network device;
computer-readable program code to parse the data from the flat file to a format to be imported by the network management system at the designated network device; and
computer-readable program code to provide the data that was parsed to the network management system.

* * * * *